(12) United States Patent
Noest et al.

(10) Patent No.: US 8,855,180 B2
(45) Date of Patent: Oct. 7, 2014

(54) RECEIVER WITH ENHANCED DC COMPENSATION

(71) Applicant: Intel Mobile Communications GmbH, Neubiberg (DE)

(72) Inventors: Peter Noest, Munich (DE); Peter Bode, Unterhaching (DE); Thorsten Tracht, Munich (DE); Clemens Troebinger, Hagenberg (AT)

(73) Assignee: Intel Mobile Communications GmbH, Neubiberg (DE)

( * ) Notice: Subject to any disclaimer, the term of this patent is extended or adjusted under 35 U.S.C. 154(b) by 66 days.

(21) Appl. No.: 13/664,564

(22) Filed: Oct. 31, 2012

(65) Prior Publication Data
US 2014/0119418 A1    May 1, 2014

(51) Int. Cl.
*H04B 3/46* (2006.01)
*H04B 17/00* (2006.01)
*H04Q 1/20* (2006.01)
*H04L 25/06* (2006.01)

(52) U.S. Cl.
CPC ............ *H04L 25/061* (2013.01); *H04B 17/004* (2013.01)
USPC .......................................... 375/224; 375/231

(58) Field of Classification Search
USPC .......................................... 375/224
See application file for complete search history.

(56) References Cited

U.S. PATENT DOCUMENTS

| | | | |
|---|---|---|---|
| 6,735,422 B1 * | 5/2004 | Baldwin et al. ............ | 455/232.1 |
| 2005/0123072 A1 * | 6/2005 | Guimaraes .................... | 375/319 |
| 2007/0275674 A1 * | 11/2007 | Chien .......................... | 455/90.2 |
| 2008/0062334 A1 * | 3/2008 | Gomez et al. ................. | 348/731 |

* cited by examiner

*Primary Examiner* — Erin File
(74) *Attorney, Agent, or Firm* — Eschweiler & Associates, LLC (57) ABSTRACT

The disclosure relates to a receiver system that employs multiple instances of a DC compensation system to reduce DC offsets in a receiver path. The receiver has a receiver front end configured to receive an RF input signal and to operate on the RF input signal according to a plurality of receiver states to generate a baseband signal having a DC offset that is based upon the plurality of receiver states. A DC offset compensation circuit implements a plurality of instances of DC offset compensation components that respectively generate an estimated DC offset corresponding to a receiver state. A controller controls the receiver state of the receiver front end and operates the DC offset elimination circuit to selectively apply one of the plurality of DC compensation components to the corresponding baseband signal based upon the receiver state.

18 Claims, 7 Drawing Sheets

RECEIVER WITH ENHANCED DC COMPENSATION

BACKGROUND

Wireless communication devices are widely used in many products today, such as cell phones, televisions, avionics, medical imaging apparatus, etc. Many wireless communication devices utilize a direct conversion receiver (i.e., a homodyne receiver) to wirelessly transmit data in the form of electromagnetic radiation.

Figure 1:
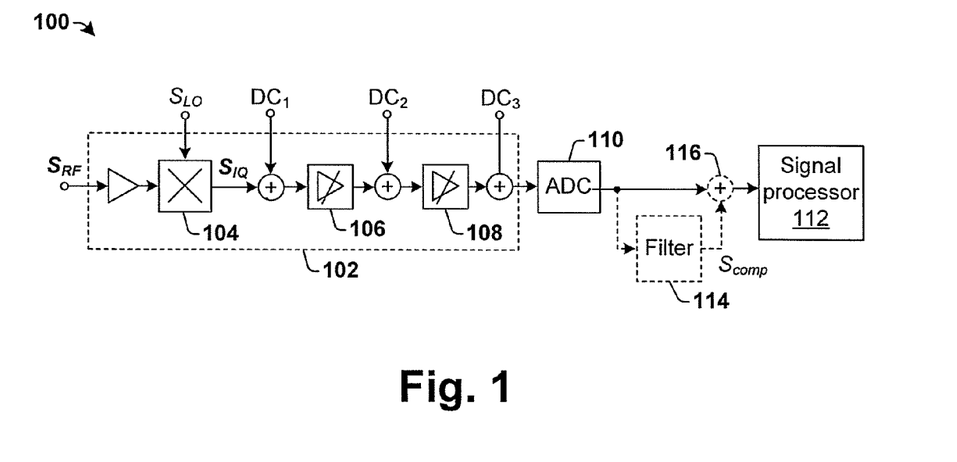
FIG. 1 illustrates a typical direct-conversion receiver.

FIG. 1 illustrates a typical direct-conversion receiver (DCR) 100. The DCR 100 comprises a receiver front end (FE) 102 configured to receive an RF input signal $S_{RF}$ from an antenna port (not shown). The receiver front end 102 comprises a mixer/demodulator 104, which is driven by a local oscillator (LO) signal $S_{LO}$ to demodulate the received signal from an RF signal $S_{RF}$ to a baseband signal $S_{IQ}$ having in-phase (I) and quadrature phase (Q) components. The receiver front end 102 further comprises one or more amplifiers 106, 108 configured to amplify the baseband signal $S_{IQ}$. The output of the receiver front end 102 is provided to an analog-to-digital converter 110 that converts the baseband signal $S_{IQ}$ from an analog signal to a digital signal, which is provided to a signal processor 112 configured to recover data from the signal.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Direct conversion receivers suffer from a number of problems including DC offsets in the IQ signals. As shown in FIG. 1, the effective DC offset in a baseband signal $S_{IQ}$ output from a receiver front end (FE) 102 is a linear combination of several contributions $DC_1$, $DC_2$, and $DC_3$. For example, an unwanted DC offset $DC_1$ at the output of mixer/demodulator 104 can result from leakage of the oscillator (LO) signal $S_{LO}$ into an antenna input, from un-symmetric LO signals, and from mixer/demodulator 104. Furthermore, each amplifier 106, 108 may introduce a DC offset $DC_2$, $DC_3$ into the IQ signal $S_{IQ}$.

Typically, the DCR 100 comprises a DC-notch filter 114 (i.e., an AC coupling or high pass filter) that generates a DC offset compensation signal $S_{COMP}$, which is fed back to the receiver path at summation node 116 to remove the DC offset. However, contributions to the DC offsets (e.g., $DC_1$, $DC_2$, $DC_3$) can change as operating parameters of the DCR 100 change. For example, changes in the gains of amplifiers 106 and 108 can lead to a step shaped DC offsets. Furthermore, the DC offset can depend on a received signal frequency, the LO signal $S_{LO}$ frequency (e.g., since cross talk attenuation is frequency selective), and other variable operating parameters.

Such changes in the DC offset make it difficult to accurately set a cut off frequency for the DC-notch filter 114. For example, if the cut-off frequency is chosen to have a value that is too high, DC transients settle quickly but useful signal distortion is large because a wide band is removed from a spectrum of the useful signal. Alternatively, if the cut-off frequency is chosen to have a value that is too low there is little distortion of the useful signal since a small band is removed from a spectrum of the useful signal, but the DC transient settles slowly leading to a degraded output signal.

Accordingly, the present disclosure relates to receiver that employs multiple instances of DC offset compensation components to reduce DC offsets in a receiver path. The receiver comprises a receiver front end configured to operate in a plurality of receiver states. The receiver is configured to receive an RF input signal and to operate on the received RF input signal with an active receiver state to generate a baseband signal having a DC offset that is based upon the active receiver state. A DC offset compensation circuit is comprised within a feedback or feed forward loop and is configured to implement a plurality of instances of DC offset compensation components that respectively generate an estimated DC offset corresponding to a receiver state. A controller with memory is configured to control the receiver state of the receiver front end and to operate the DC offset compensation circuit to selectively apply one of the plurality of DC compensation components to the baseband signal based upon the receiver state.

Figure 2:
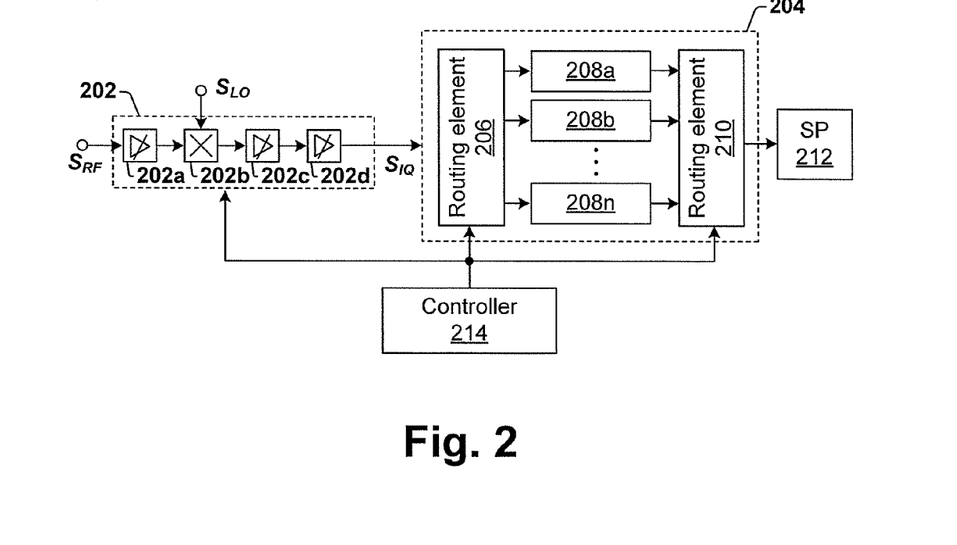
FIG. 2 illustrates a block diagram of a disclosed receiver system having a multiple instances of a DC offset compensation component configured to reduce DC offsets in a received RF input signal.

FIG. 2 illustrates a block diagram of a disclosed receiver system 200 having a multiple instances of DC offset compensation components 208a-208n configured to reduce DC offsets in a received RF input signal $S_{RF}$.

The receiver system 200 comprises a receiver front end 202 configured to receive a RF input signal $S_{RF}$ from an antenna port (not shown). The receiver front end 202 comprises a demodulator 202b that is configured to demodulate the RF input signal $S_{RF}$, based upon a local oscillator (LO) signal $S_{LO}$, to generate a baseband signal $S_{IQ}$ having in-phase (I) and quadrature phase (Q) components. The receiver front end 202 further comprises one or more amplifier elements, 202a, 202c, and/or 202d configured to amplify the received RF input signal according to gain settings. The one or more amplifier elements, 202a, 202c, and/or 202d, may comprise a low noise amplifier and/or a variable gain amplifier, for example.

The receiver front end 202 is configured to operate in a plurality of receiver states respectively having specific gain settings. The gain setting of a receiver state may depend upon one or more characteristics of the DCR 200 such as: a frequency of a received RF input signal $S_{RF}$, the frequency of the LO signal $S_{LO}$, temperature, input signal power, etc. Each receiver state generates an associated DC offset in the baseband signal $S_{IQ}$. In some cases, respective receiver states may correspond to a time period of the RF input signal $S_{RF}$ (e.g., at a first time period receiver front end 202 operates in a first receiver state, at a second time period receiver front end 202 operates in a second receiver state, etc.).

The baseband signal $S_{IQ}$ is provided to a DC offset compensation circuit 204 comprising a plurality of instances of DC offset compensation components 208a-208n. Respective instances of DC offset compensation components 208a, 208b, or 208n are configured to reduce a DC offset associated with a receiver state. In some cases, each receiver state may be assigned an individual instance of a DC offset compensation component configured to reduce a DC offset associated with a receiver state. For example, a first instance of a DC offset compensation component 208a is configured to reduce DC offsets associated with a first receiver state, a second instance of a DC offset compensation component 208b is configured to reduce DC offsets associated with a second receiver state, etc.

In some examples, the instances of DC offset compensation components 208a-208n may comprise a plurality of hardware (i.e., physical) components such as DC-notch filters, for example, which respectively generate a DC offset associated with a receiver state. In other examples, the DC offset compensation components 208a-208n may comprise a single hardware component (e.g., a low-pass filter) operated in various ways (e.g., according to various state parameters) to provide for a plurality of virtual instances of DC offset compensation components. In some cases, the number of instances of DC offset compensation components may be equal to the number of receiver states. Alternatively, the number of instances of DC compensation components may be smaller than the number of receiver states, since DC offsets between receiver states are correlated.

A controller 214 is in communication with the receiver front end 202 and the DC offset compensation circuit 204. The controller 214 is configured to generate one or more control signals that control a receiver state of the receiver front end 202 (e.g., that sets amplifier gains of the receiver front end). The one or more control signals also control operation the DC offset compensation circuit 204 to selectively activate a DC offset compensation component 208 that is applied to the baseband signal $S_{IQ}$ based upon the receiver state of the receiver front end 202. Therefore, when a new receiver state is activated in the receiver front end 202, the controller 214 activates an associated instance of a DC offset compensation component, 208a, 208b, . . . , or 208n. By selectively applying an instance of a DC offset compensation component 208 to the baseband signal $S_{IQ}$ based upon a receiver state, the DC offset compensation circuit 204 is able to use a DC offset compensation component 208 that is specifically chosen to accurately reduce DC offsets in spite of changing receiver states.

In some cases, the DC offset compensation circuit 204 may comprise a first routing element 206 and a second routing element 210. The first routing element 206 is configured to selectively apply a DC offset compensation component 208 to the baseband signal $S_{IQ}$ based upon a receiver state of the receiver front end 202. The second routing element 210 is configured to provide a signal having a mitigated DC offset to a signal processor 212.

It will be appreciated that the disclosed receiver systems (e.g., receiver systems 200, 300, etc.) are not limited to any type of radio access technology, but instead may be used in any radio access technology. For example, the disclosed receiver systems may be configured to operate according to UMTS (Universal Mobile Telecommunications System), LTE (Long Term Evolution), CDMA (Code division multiple access), TDSCCDMA (Time Division Synchronous Code Division Multiple Access), etc.

Figure 3A:
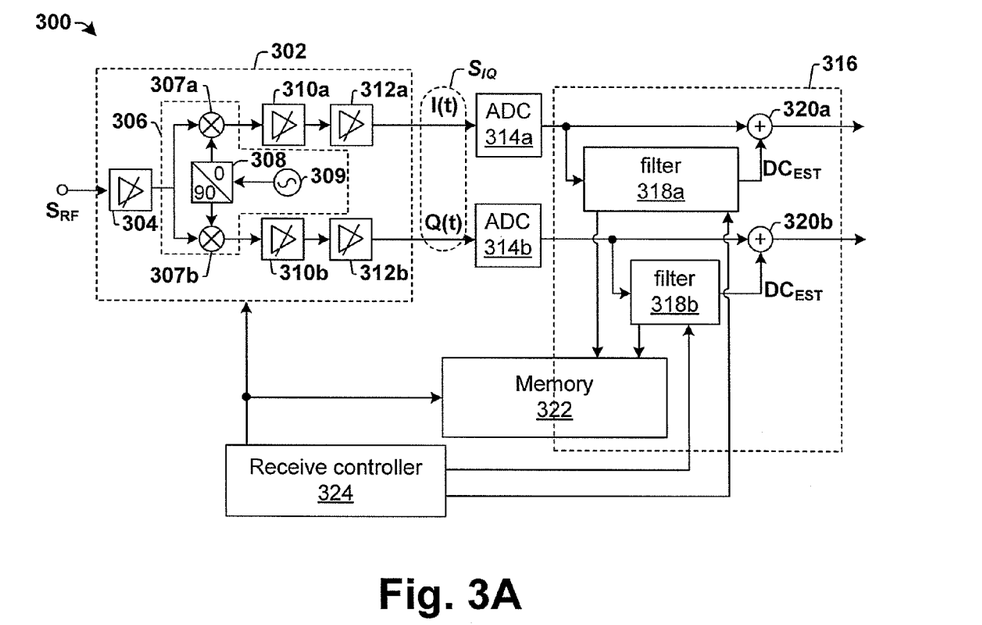
FIGS. 3A-3B illustrate a more detailed example of a disclosed receiver system having a low-pass filter configured to provide for multiple instances of a DC compensation component configured to reduce DC offsets in a received RF input signal.
Figure 3B:
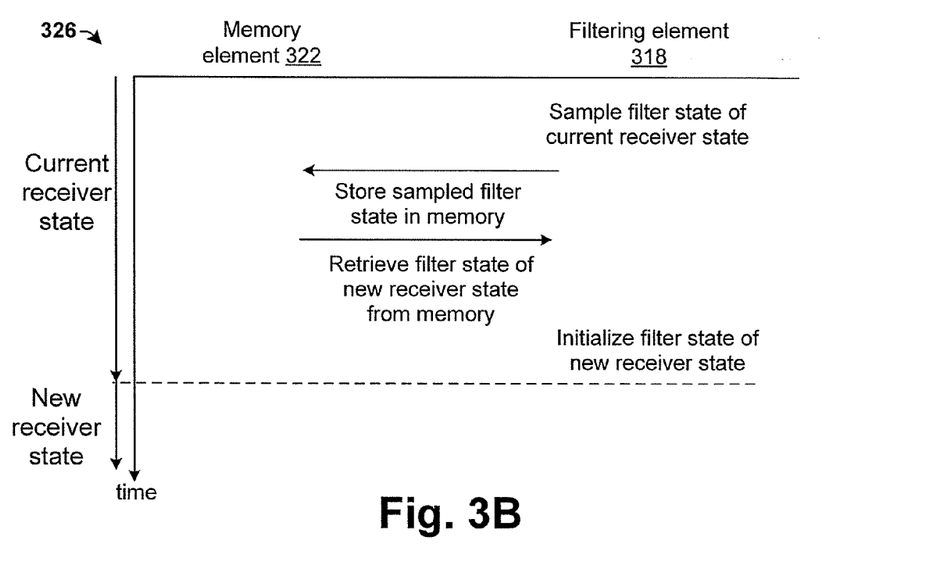

FIGS. 3A-3B illustrate a more detailed example of a disclosed receiver system having a filtering element configured to provide for multiple instances of a DC offset compensation component configured to reduce DC offsets in a received RF input signal.

FIG. 3A illustrates a block diagram of a disclosed receiver system 300. The receiver system 300 comprises a receiver front end 302 configured to receive an RF input signal $S_{RF}$ and to operate in a plurality of receiver states to generate the baseband signal $S_{IQ}$ comprising an in-phase component I(t) and a quadrature-phase component Q(t)

In some cases, the receiver front end 302 comprises a first amplifier element 304 (e.g., a low noise amplifier) configured to receive the RF input signal $S_{RF}$ from an antenna port (not shown). The first amplifier element 304 is configured to amplify the RF input signal by a first gain and to provide the amplified RF input signal $S_{RF}$ to a demodulator 306 comprising a first mixer 307a and a second mixer 307b. The first mixer 307a is configured to mix the RF input signal $S_{RF}$ with a local oscillator signal generated by local oscillator 309 to generate an in-phase component I(t) of a baseband signal $S_{IQ}$. The second mixer 307b is configured to mix the RF input signal $S_{RF}$ with a local oscillator signal having a 90° phase shift, generated by local oscillator 309 and phase shift element 308, to generate a quadrature phase component Q(t) of the baseband signal $S_{IQ}$). The in-phase component I(t) and the quadrature phase component Q(t) are subsequently provided to one or more amplifier elements, 310 and 312, configured to amplify the in-phase and quadrature phase components. The amplified in-phase and quadrature phase components may be provided to analog-to-digital converters (ADC) 314 configured to convert the analog signals to digital signals, which are provided to a DC offset compensation circuit 316.

The DC offset compensation circuit 316 comprises filtering elements 318a, 318b connected in parallel with the in-phase and quadrature phase paths. The filtering elements 318a, 318b are configured to provide estimated DC offsets $DC_{EST}$ to summation elements, 320a and 320b, which subtract the estimated DC offsets $DC_{EST}$ from the baseband signal $S_{IQ}$.

Because a single receiver state (e.g., a selection of gain settings of the receiver front end 302) is active at a given time, it is sufficient to use a single filtering element 318, along with receiver state variables that define a filter state corresponding to each receiver state, to provide for multiple virtual instances of a DC offset component in the signal path of the in-phase and quadrature-phase components. For example, applying receiver state variables of different filter states to a filtering element 318 adjusts the filtering element 318 to provide for multiple virtual instances of DC offset compensation components that reduce the DC offset associated with the different receiver states.

Direct conversion receiver 300 may further comprise a memory 322. In various cases, the memory 322 may be configured to store data relating to filtering coefficients (e.g., that control a bandwidth of the filtering elements 318), DC compensation related state variables, and/or filter states. In some cases a receive controller 324 is configured to control a receiver state of the receiver front end 302 and to provide the receiver state to the memory element 322. Upon receiving a receiver state, the memory element 322 is configured to apply the stored receiver state variables of a filter state associated with the active receiver state to filtering elements, 318a and 318b. The applied receiver state variables of the filter state change the filtering response of the filtering elements, 318a and 318b, in a manner that effectively reduces a DC offset in the baseband signal $S_{IQ}$.

In some cases, data stored in the memory 322 may be updated to enable learning to improve reduction of the DC offset in the baseband signal $S_{IQ}$. For example, in some cases the memory 322 may operate in a continuous operating mode wherein data (e.g., relating to filter coefficients, DC compensation related state variables, and/or filter states) may be updated for each IQ sample of the RF input signal. In other embodiments, the memory 322 may be operated in a sample-and-hold operating mode wherein data may be updated from time to time (e.g., on receiver state changes).

FIG. 3B illustrates a diagram 326 showing operation of a receiver system that is configured to update filter states in a sample and hold mode of operation. During operation, whenever the receive controller 324 plans to activate a new receiver state, it the filtering elements 318 are operated to sample a current filter state (e.g., measure a DC offset) as one or more receiver state variables, while the receiver state variables of other filter states remain unchanged. The one or more receiver state variables are stored in the memory element 322 at an address corresponding to the current receiver state. Next, one or more receiver state variables of a filter state corresponding to the new receiver state are retrieved from memory element 322 and the filtering elements 318 with the retrieved filter state (i.e., one or more receiver state variables) are initialized. By updating the filter state, the memory element 322 is able to learn to improve the estimated DC offset values in the baseband signal $S_{IQ}$ for each individual receiver state.

Figure 4A:
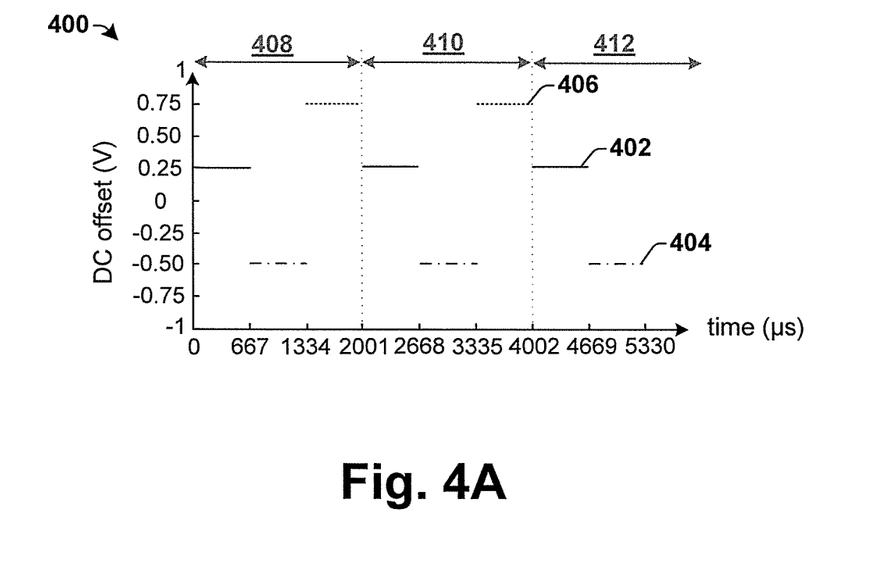
FIGS. 4A-4B show graphs illustrating the DC settling transients for a receiver system having a multiple notch filter instances.
Figure 4B:
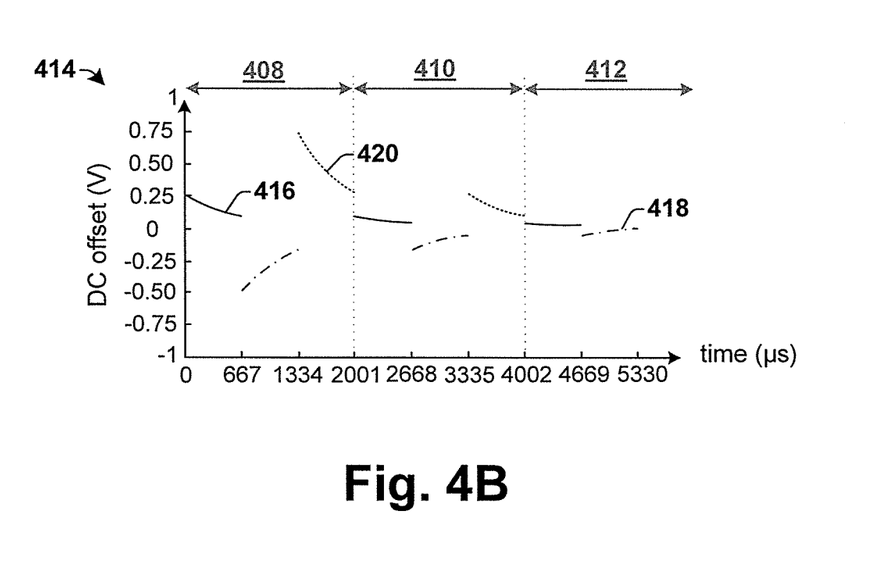

FIGS. 4A-4B respectively show graphs, 400 and 414, illustrating the DC settling transients of a RF input signal according to the disclosed receiver system with changing receiver states.

Graph 400 illustrates the DC offset of a baseband signal being provided to a DC offset compensation circuit (e.g., DC offset compensation circuit 316). The DC offset signal is illustrated for signals associated with three time periods 402, 404, and 406 that are cycled through periodically in timeframes 408, 410, or 412. Each time period is associated with a different receiver state (e.g., with distinct gain settings) having a different DC offset value. For example, a first time period 402 is associated with a first receiver state having a first DC offset, a second time period 404 is associated with a second receiver state having a second DC offset, and a third time period 406 is associated with a third receiver state having a third DC offset.

In a first timeframe 408, in a first time period 402 extending from 0 to 667 μs, the baseband signal has a constant DC offset of 0.25 V. In the first timeframe 408, in a second time period 404 extending from 667 to 1334 μs, the baseband signal has a constant DC offset of −0.5 V. In the first timeframe 408, in a third time period 406 extending from 1334 to 2001 μs, the baseband signal has a constant DC offset of 0.75 V. During subsequent timeframes, 410 and 412, the baseband signal repeats the DC offsets of the first timeframe 408.

Graph 414 illustrates a DC settling transient of the baseband signal. As illustrated in graph 414, the DC settling transient of an instance of a DC offset component (e.g., a filter state) for a certain receiver state is set on hold while another receiver state is active (i.e., while an instance of a DC offset component is inactive, receiver state variables associated with the inactive instance of a DC offset component are frozen). If the receiver state is activated again, the DC settling transient continues, resulting in accurate DC offset cancellation for each receiver state.

For example, during the first timeframe 408 the DC offset components in the first time period 416, the second time period 418, and the third time period 420 are reduced from their initial values (respectively 0.25 V, −0.5 V, and 0.75 V) to smaller second values (respectively, approximately 0.07 V, −0.15 V, and 0.25 V). Since a filtering element associated with the receiver state is sampled and state variables are stored in memory, DC offset learning enables a reduction in the value of the DC offset for time periods 416, 418, and 420, to continue in the second timeframe 410 from the second values to a smaller third value (respectively, approximately 0.04 V, −0.05 V, and 0.10 V). Similarly, a filtering element associated with the receiver state is sampled and state variables are stored in memory, DC offset learning enables a further reduction in the value of the DC offset for time periods 416, 418, and 420, continues in the third timeframe 412 from the third values to a smaller fourth value.

Figure 5:
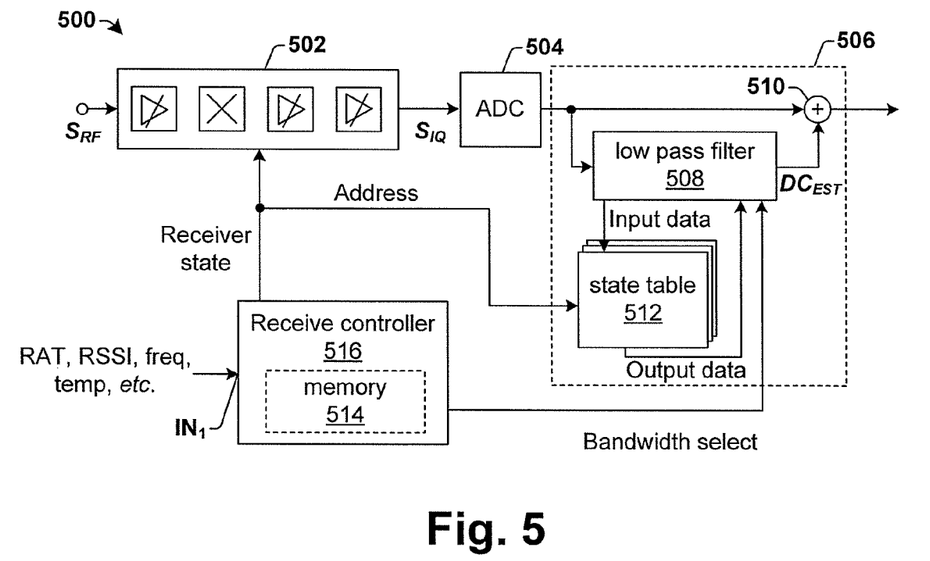
FIG. 5 illustrates a block diagram of a disclosed receiver system having a feed-forward topology with digital DC offset cancellation.

FIG. 5 illustrates a block diagram of a disclosed receiver system 500 comprising a feed-forward topology having a feed-forward path/loop comprising a plurality of instances of DC offset compensation components configured to implement a digital DC offset cancellation. It will be appreciated that although FIG. 5 illustrates a baseband signal $S_{IQ}$ as a single signal path, that the baseband signal $S_{IQ}$ may comprise separate signal paths that respectively convey in-phase and quadrature phase components of the baseband signal $S_{IQ}$. Moreover, the separate signal paths may comprise separate ADCs 504 and low-pass filters 508, that are configured to operate as described below in the separate signal paths.

The receiver system 500 comprises a receiver front end 502 having one or more amplifier elements and a demodulator. A baseband signal $S_{IQ}$ having in-phase and quadrature-phase components is output of the receiver front end 502. The baseband signal $S_{IQ}$ is provided to an analog-to-digital converter 504 configured to convert the baseband signal $S_{IQ}$ from an analog signal to a digital signal, which is provided to a DC offset compensation circuit 506.

The DC offset compensation circuit 506 comprises a low-pass filter 508 and a summation element 510. The low-pass filter 508 is configured to generate an estimated DC offset $DC_{EST}$ comprising an estimate of the DC offset for the in-phase and quadrature phase components of the baseband signal $S_{IQ}$. In some cases, the low-pass filter 508 may comprise a digital filter having a filtering response having a filter state defined by one or more receiver state variables. The estimated DC offset $DC_{EST}$ is provided to a summation element 510 located downstream of the low-pass filter 508. The summation element 510 is configured to subtract the estimated DC offset $DC_{EST}$ from the baseband signal $S_{IQ}$. By generating an estimated DC offset $DC_{EST}$ that is subtracted from the baseband signal $S_{IQ}$ with summation element 510, the low-pass filter 508 acts as a DC-notch filter that removes the DC offset in the receiver path. Furthermore, since the summation element 510 is downstream of the ADC 504, the estimated DC offset $DC_{EST}$ comprises a digital signal.

A receive controller 516 is configured to control the receiver state of the receiver front end 502 and to operate the DC offset compensation circuit 506 to select an instance of a DC compensation component to apply to the baseband signal $S_{IQ}$. In some cases, the receive controller 516 comprises an input node $IN_1$ configured to receive one or more parameters upon which a receiver state may be selected. For example, the receive controller 516 may be configured to receive one or more parameters such as a RAT (Radio access technology) used by the receiver system 500, a RSSI (received signal strength indicator), a frequency, a temperature, etc. Based upon the one or more received parameters, the receive controller 516 is configured to provide a receiver state (e.g., comprising amplifier gains) to the receiver front end 502.

In some cases, the receive controller 516 comprises a memory 514 configured to store DC offset compensation related state variables corresponding to the one or more parameters received at input node $IN_1$ of the receive controller 516. The DC offset compensation related state variables comprise gain settings of the receiver front end 502 and may be chosen to be characterized to include the one or more parameters. The stored DC offset compensation related state variables can be used to improve the performance of the receiver system 500 as the one or more parameters change. For example, the receive controller 516 may vary a receiver state to find a minimal DC offset associated with a set of one or more parameters. Once the receiver state is determined, it can be saved in memory 514. When the receive controller 516 receives the set of one or more parameters, it can access data stored in the memory 514 and retrieve DC offset compensation related state variables (e.g., having gain settings) that provide for a relative low DC offset in the baseband signal.

In some cases, the receive controller 516 can also control a bandwidth of the low-pass filter 508. In various examples, adjusting the bandwidth of the low pass filter 508 can be performed by changing filter coefficients in hardware and/or software. For example, receive controller 516 may reduce the bandwidth of the low-pass filter 508 in order to reduce signal distortion. In some cases, the received controller 516 is configured to sweep the bandwidth of the low-pass filter 508 between a starting bandwidth and an ending bandwidth to improve performance of the receiver 500. For example, for each receiver state change, the receive controller 516 may initially increase a bandwidth of the low-pass filter 508 to enable a fast settling/response before lowering the bandwidth so that the low-pass filter 508 removes a small bandwidth of the useful signal comprising DC offset components (and not information in the $S_{IQ}$ signal).

In other cases, memory 514 may be further configured to store one or more filter coefficients relating to a bandwidth for different receiver states. In such cases, the receive controller 516 may vary a bandwidth of the low-pass filter 508 to find an optimal bandwidth associated with a receiver state. Once the bandwidth is determined, it can be saved in memory 514. When the receive controller 516 operates with a receiver state, it may access the memory 514 to adjust the bandwidth to the stored value.

A DC compensation state table (DCST) 512 is configured to store receiver state variables corresponding to filter states of the low-pass filter 508 for a plurality of receiver states. The DCST 512 is configured to receive the receiver state from the receive controller 516 and to adjust a filter state of the low-pass filter 508 based upon the receiver state. In some cases, state variables of a filter state corresponding to a receiver state may change over time. For example, the DCST 512 may be initially populated with estimated state variables corresponding to estimated DC offsets. The estimated DC offsets may be determined by calculation, simulation, prototype calibration measurements, factory calibration measurements, self calibration measurements, or some other method. In some cases, estimated state variables corresponding to a receiver state can be determined based upon a DC offset sampled from another filter state due to correlation between the different receiver states.

After operation begins, the receive controller 516 is configured to operates the low pass filter 508 to sample a filter state of the low-pass filter 508 (e.g., measure a DC offset), and based upon the sampled filter state to replace the estimated state variables in the DCST 512 with state variables determined from the sampled filter state. The receiver system 500 can improve the DC offset cancellation through an iterative process of sampling a state of the low-pass filter 508, changing state variables in response to the sampled filter state, and applying new state variables to the low-pass filter. Over time, determining state variables from sampled filter states can improve the estimated values of the DC offset so that the estimated DC offset $DC_{EST}$ fully accounts for the DC offset in the baseband signal $S_{IQ}$.

In some embodiments, the different learning methods (e.g., changing bandwidth, DC offset compensation state variables, filter state) may be combined to improve DC offset reduction. For example, in some embodiments, the receive controller 516 may adjust the bandwidth of the low-pass filter 508 for receiver states that do not yet have a stored DC offset compensation state variables, while the bandwidth can be kept low for receiver states that have stored DC offset compensation state variables.

Figure 6:
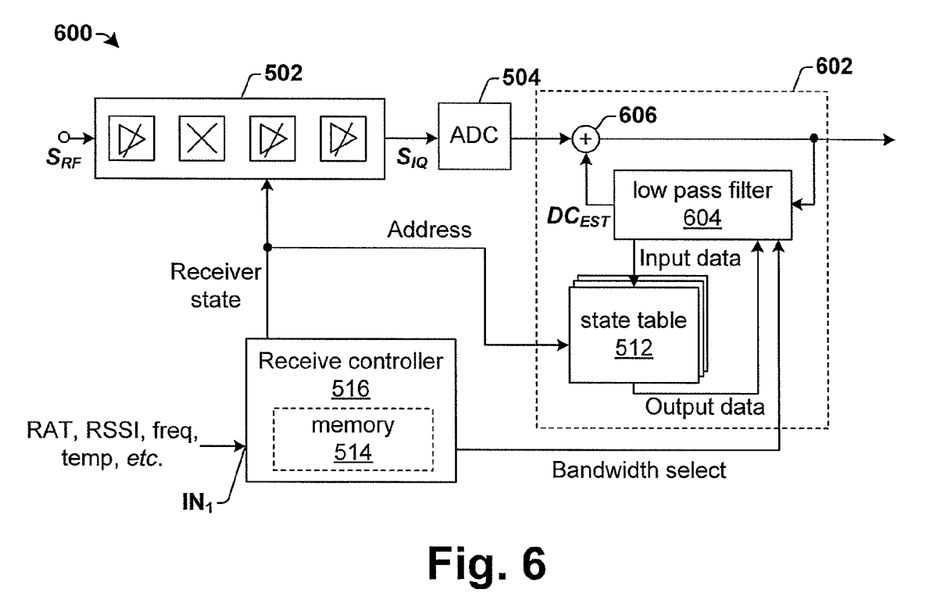
FIG. 6 illustrates a block diagram of a disclosed receiver system having a feed-back topology with digital DC offset cancellation.

FIG. 6 illustrates a block diagram of a disclosed receiver system 600 comprising a feed-back topology having a feed-back path/loop comprising a plurality of instances of DC offset compensation components configured to implement a digital DC offset cancellation.

Receiver system 600 is similar to that of receiver system 500, except that it comprises a feed-back topology, in which the low-pass filter 604 is configured to insert a estimated DC offset $DC_{EST}$ at a summation element 606 located upstream of the low-pass filter 604 and downstream of the ADC 504. In particular, ADC 504 is configured to provide a digital baseband signal to DC offset compensation circuit 602. The low pass-filter 604, within DC offset compensation circuit 602, filters the digital signal to generate an estimated DC offset $DC_{EST}$, which is inserted into the digital baseband signal $S_{IQ}$ at summation element 606.

By inserting the estimated DC offset $DC_{EST}$ at a summation element 606 located upstream of the low-pass filter 604, the low-pass filter 604 operates to estimate the DC offset from a signal that has a DC offset reduction. Therefore, the low-pass filter 604 may comprise an integral component configured to incrementally increase the estimated DC offset $DC_{EST}$ of a receiver state based upon a difference between the estimated DC offset $DC_{EST}$ of a prior iteration and an actual DC offset.

Figure 7:
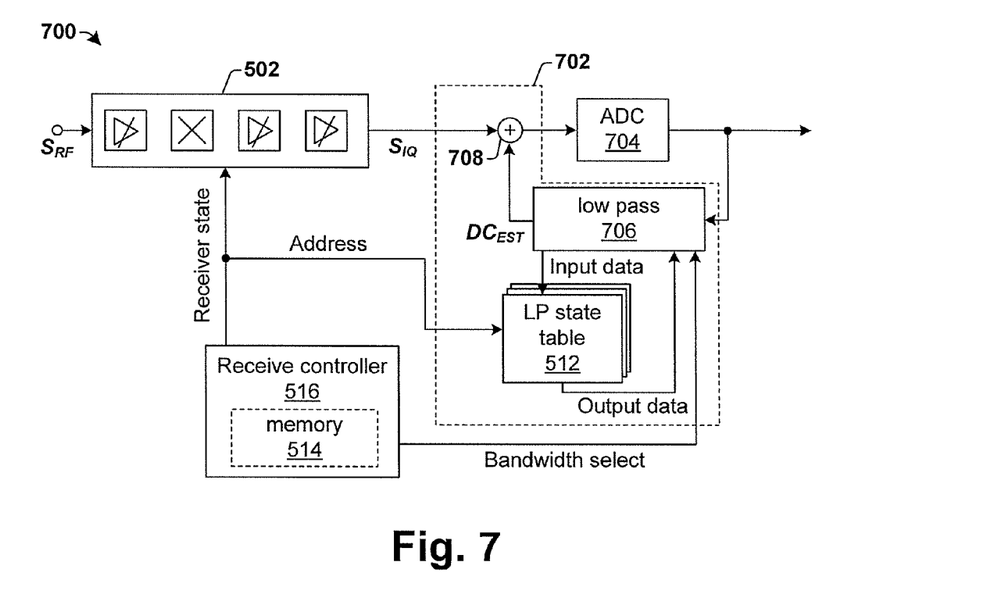
FIG. 7 illustrates a block diagram of a disclosed receiver system having a feed-back topology with analog DC offset cancellation.

FIG. 7 illustrates a block diagram of a disclosed receiver system 700 comprising a feed-back topology having a feed-back path/loop comprising a plurality of instances of DC offset compensation components configured to implement an analog DC offset cancellation.

Receiver system 700 is similar to that of receiver system 600, except that the low-pass filter 706 is configured to insert an estimated DC offset $DC_{EST}$ at a summation element 708 that located upstream of the low-pass filter 706 and upstream of ADC 704. In particular, the receiver front end 502 provides an analog baseband signal $S_{IQ}$ to DC offset compensation circuit 702. The analog baseband signal $S_{IQ}$ is then further provided to ADC 704 which outputs a digital signal. The low pass filter 706, within DC offset compensation circuit 702, filters the digital signal to generate an estimated DC offset $DC_{EST}$, which is inserted into the analog baseband signal at summation element 708. By inserting the estimated DC offset $DC_{EST}$ at a summation element 708 located upstream of the ADC 704, the estimated DC offset $DC_{EST}$ comprises an analog signal.

Figure 8:
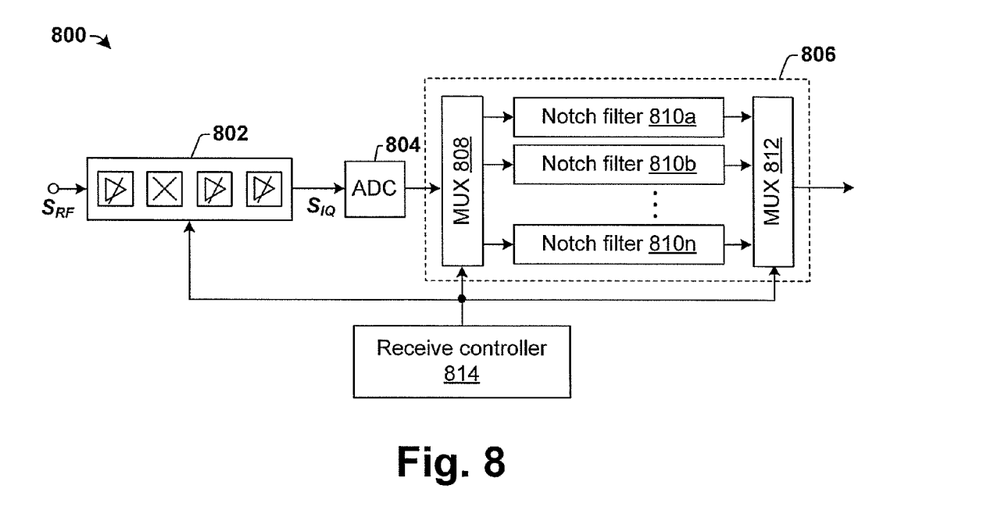
FIG. 8 illustrates a block diagram of a disclosed receiver system having a plurality of DC offset cancellation hardware components.

FIG. 8 illustrates a block diagram of a disclosed receiver system 800 having a plurality of DC offset cancellation hardware components.

The receiver system 800 comprises a receiver front end 802 having one or more amplifier elements and a demodulator. The receiver front end 802 is configured to receive an RF input signal $S_{RF}$ and there from to generate a baseband signal $S_{IQ}$ having one or more DC offsets. The baseband signal $S_{IQ}$ is provided to an analog-to-digital converter 804, and subsequently to a DC offset compensation circuit 806.

The DC offset compensation circuit 806 comprises a first multiplexor 808 configured to receive the baseband signal $S_{IQ}$ and to selectively provide the baseband signal $S_{IQ}$ to one of a plurality of DC-notch filters 810a-810n based upon a control signal received from a receive controller 814. The first multiplexor 808 selectively provides the baseband signal $S_{IQ}$ to a DC-notch filter 810 according to the receiver state of the receiver front end 802. The notch filter 810 is configured to remove the DC offset from the baseband signal $S_Q$. The baseband signal $S_{IQ}$ is then provided to a second multiplexor 812 configured to provide the baseband signal $S_{IQ}$ to an output node.

Figure 9A:
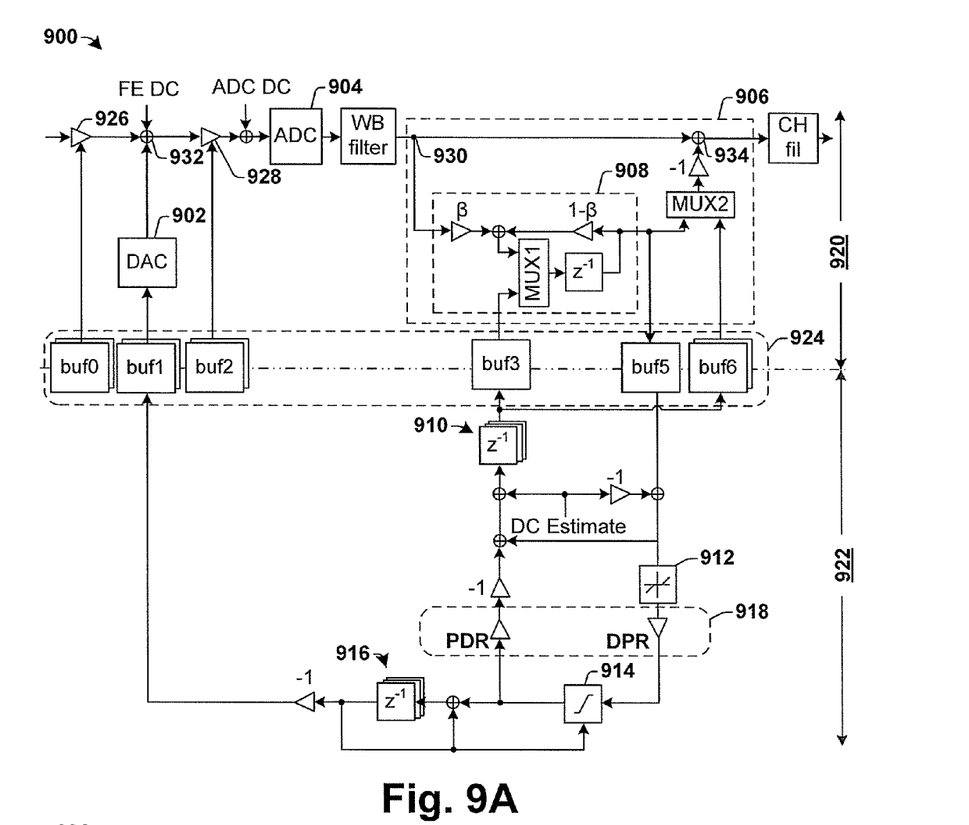
FIG. 9A illustrates a block diagram of a disclosed receiver system having hybrid feed-forward/feed-back topology.
Figure 9B:
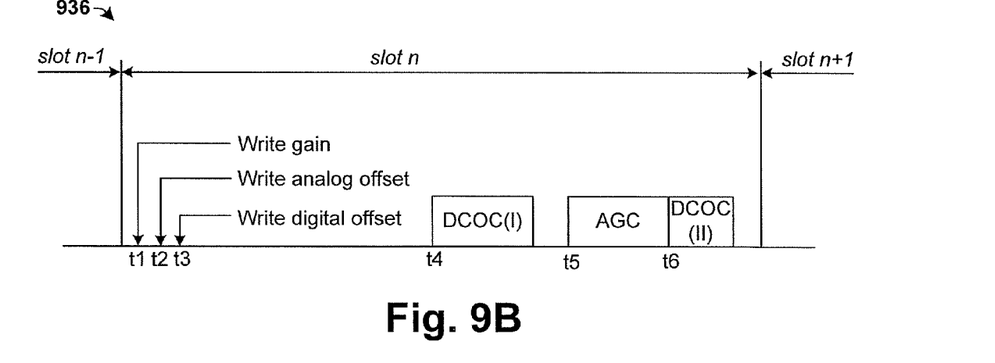
FIG. 9B illustrates a timing diagram showing operation of the receiver system of FIG. 9A.

FIGS. 9A-9B illustrate a disclosed receiver system having a hybrid feed-forward and feed-back topology.

FIG. 9A illustrates a block diagram of a disclosed receiver system 900 having the hybrid feed-forward/feed-back topology. The hybrid topology has a measurement node 930 at which a DC offset in the baseband signal is measured. The DC offset is then provided to a DC offset cancellation system that provides for a dual point DC offset cancellation with an analog feed-back path and a digital feed-forward path. The analog feed-back path is configured to provide a course analog cancellation of the DC offset, by way of digital-to-analog converter (DAC) 902, to a first summation node 932 located upstream of the measurement node 930. The digital feed-forward path is configured to provide a fine digital cancellation of the DC offset that remains after the DC offset is compensated in the digital domain, by way of a sample-hold and AC-coupling (SHAC) unit 906, to a second summation node 934 located downstream of the measurement node 930.

The DC offset cancellation system that operates according to a hardware domain 920 and a firmware domain 922. The hardware domain 920 and the firmware domain 922 are separated from one another by way of a plurality of buffered registers 924, buf0-buf5. Buffered registers buf0-buf2 and buf 5 comprise shadow buffers, respectively having a chain of buffers with an input buffer configured to receive data from the firmware domain and an output buffer configured to provide data from the input buffer to the hardware domain.

The hardware domain comprises SHAC unit 906, which comprises a first order IR low pass filter 908 that measures the DC offset in the baseband signal. The measured DC offset is provided to the firmware domain 922, via buffer buf5. The analog feed back path and the digital feed forward path are provided DC offset values determined by a first and second control loops in the firmware domain 922, which receive the measured DC offset from buf5.

The measured DC offset is provided to a dead zone and hysteresis element 912. The dead zone and hysteresis element 912 separates the estimated DC offset into two parts, a first part that performs digital cancellation via the low-pass filter 908 and a second part that performs analog cancellation via the DAC 902. The separation is governed by a dead zone function, in which estimated DC offset components exceeding a predetermined dead zone threshold represent a tentative DAC share. Since estimated DC offset components exceeding the dead zone threshold represent a tentative DAC share, analog feed-back compensation is activated if the DC offset measured after analog compensation exceeds the dead zone threshold. This way, large DC offsets are cancelled upstream of ADC 904, so that the DC offsets do not reduce the dynamic range of the ADC 904.

The DC offset share cancelled by DAC 902 follows from applying quantization and look-ahead saturation at element 914. Look-ahead saturation means that the actual DAC share is saturated such that overflow of the DAC will be avoided when accumulating the actual DAC share to the existing DAC value. The DC offset share cancelled by low pass filter becomes the part of the DC measurement which is not covered by the DC offset share cancelled by DAC 902. The exchange of signals between the low-pass filter 908 and DAC 902 is done via amplifiers 918 configured to implement conversion factors.

The DC offset share cancelled by the low-pass filter 908 and the DAC 902 are respectively provided to memory tables (e.g., RAM tables), 910 and 916, which are configured to store filter states depending upon a DC offset shared determined from a DC offset measured by SHAC unit 906. In some embodiments, the filter states are equal to one another. In other embodiments, the filter states may be different from one another. For example, in some cases memory table 916 stores a coarse filter state corresponding to an analog signal that is configured to provide for a coarse correction of the DC offset at the first summation node 932, while memory table 910 stores a fine filter state corresponding to a digital signal that is configured to provide for a fine correction of the DC offset at the second summation node 934. Addressing of the memory tables, 910 and 916, is done via a gain index. Therefore, once a new gain index is determined for a next slot, cancellation values are retrieved from address in the memory tables, 910 and 916, which correspond to the new gain index.

In some cases, the hardware domain 920 may operate in a continuous operating mode while the firmware 922 may operate in a sample-and-hold operating mode. In the continuous operating mode, for each IQ sample the low pass filter 908 is operated to measure a DC offset and to provide the measured DC offset to a summation node at the output of MUX2. In the sample-and-hold operating mode, the variables stored in 910 and 916 are updated at each receiver state change. However, the DC offset is provided to the summation node at the output of MUX2 at certain times (e.g., periodically, at the start or end of each subframe, every n-th sample, where n depends on a mobile standard and sampling rate, etc.).

During operation, the SHAC unit 906 iteratively operates to reduce the DC offset by applying a digital DC offset estimated in a time slot. During a first time slot, the baseband signal is passed through the SHAC unit 906 without compensation, since no predictor estimate is available yet. Once a DC offset estimate becomes available, the error signals settle to a relatively constant value (e.g., since the DC offset estimate falls into the "dead zone").

FIG. 9B illustrates an exemplary timing diagram 936 showing operation of receiver system 900 configured to implement a two point DC offset cancellation (DCOC). In particular, the timing diagram shows register access timing and firmware activity within a time slot, slot n.

At a first time $t_1$, within slot n, gain state n values stored in output buffers buf0 and buf2 are updated. The gain state n values are applied to LNA 926 and amplifier 928 to define a receiver state having a DC offset (e.g., FE DC and ADC DC) associated therewith.

At a second time $t_2$, within slot n, an analog offset value stored in output buffer buf1 is updated. Accordingly, the analog output of the DAC 902 is updated at this time.

At a third time $t_3$, within slot n, a digital offset value is read out from RAM table 910 and written to buf3. The low pass filter (predictor) 908 starts operating in a continuous operating mode with the initial value provided by buf3.

At a fourth time $t_4$, within slot n, an estimated DC offset generated by the low pass filter (predictor) 908 is read out to buf5 and continuous operation of low pass filter (predictor) 908 is halted. Along with the first DC offset compensation calculation period (DCOC(I)), the DC offset associated with the gain state n is updated in RAM table 910 and 916.

At a fifth time $t_5$, within slot n, gain state n+1 values are calculated for a new receiver state. At the end of the calculation period the new gain state n+1e are latched into the input buffers of burn and buf2.

At a sixth time $t_6$, within slot n, a second DCOC calculation period (DCOC(II)) is started. At the end of DCOC(II), $P_{pred}$ and $P_{DAC}$ RAM addresses for the new gain state of n+1 and therefore the input values for buf1 and buf3 are provided. The values are latched into the input buffers of buf1 and buf3

Figure 10:
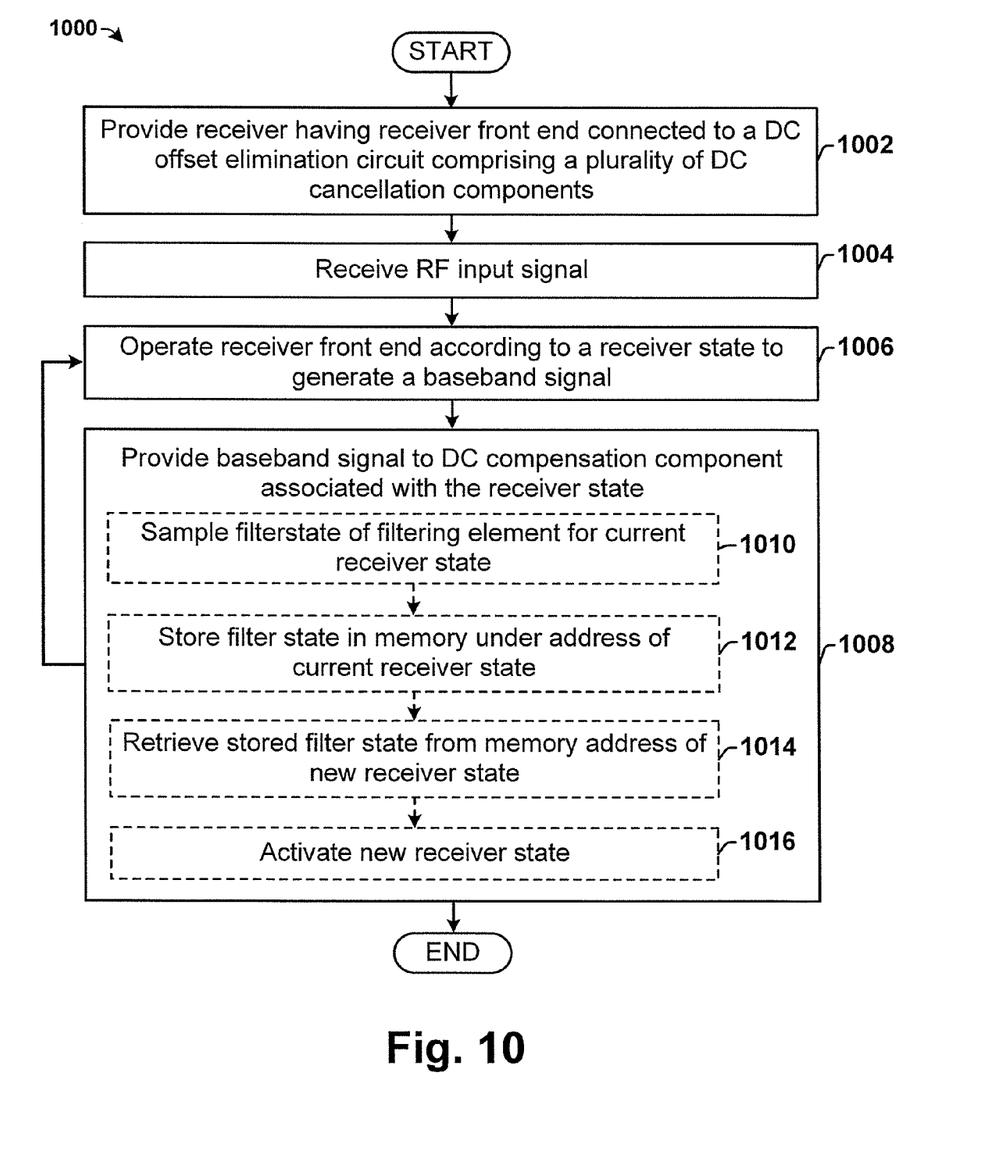
FIG. 10 is a flow diagram of an exemplary method to effectively mitigate DC offsets within a receiver system operating in a plurality of different receiver states.

FIG. 10 is a flow diagram of an exemplary method 1000 to effectively mitigate DC offsets within a receiver system operating in a plurality of different receiver states.

While the disclosed method 1000 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects of the description herein. Further, one or more of the acts depicted herein may be carried out in one or more separate acts and/or phases At 1002, a receiver system is provided having a receiver front end connected to a DC offset compensation device having a plurality of DC offset compensation components. The DC offset compensation components are configured to mitigate DC offsets for different receiver states of the receiver front end.

At 1004, an RF input signal is received. The RF input signal is configured to be operated upon by one or more of the plurality of receiver states. In some examples, the RF input signal may comprise a plurality of time periods, wherein one or more of the time periods may correspond to different receiver states.

At 1006, the receiver front end is operated to generate a baseband signal according to a receiver state. In some examples, the receiver front end is operated to demodulate and amplify the RF input signal according to a receiver state of a time period of the RF input signal.

At 1008, the baseband signal is provided to a DC offset compensation component corresponding to the receiver state. The DC offset compensation component may comprise a filtering element configured to estimate a DC offset corresponding to the receiver state and a summation element configured to subtract the estimated DC offset from the baseband signal.

In some examples, providing the RF input signal to a DC offset compensation signal can be achieved according to acts 1010-1016. At 1010, the filter state of the filtering element is sampled for a current receiver state. At 1012, the filter state is stored in a memory element at an address associated with the current receiver state. At 1014, the filter state is retrieved from a memory element at an address associated with a new receiver state. At 1016, a new receiver state is activated.

It will be appreciated that acts 1006 and 1008 can be performed iteratively. When performed iteratively, the bandwidth of the filtering element, gain settings of a receiver state, and/or filter states may be adjusted to improve performance of the method.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A receiver, comprising:
   a receiver front-end configured to receive an input signal and to operate on the input signal with a plurality of receiver states to generate a baseband signal having one or more DC offsets corresponding to the plurality of receiver states;
   a DC offset compensation circuit comprised within a feedback path or a feed forward path and configured to implement a plurality of instances of DC offset compensation components, which respectively generate an estimated DC offset corresponding to one of the plurality of receiver states; and
   a controller configured to control a current receiver state of the receiver front end and to operate the DC offset compensation circuit to selectively apply one of the plurality of instances of DC offset compensation components to the baseband signal based upon the current receiver state;
   wherein the DC offset compensation circuit comprises:
     a filtering element configured to generate a plurality of estimated DC offset for the plurality of instances of DC offset compensation components according to one or more receiver state variables; and a summation element configured to subtract the estimated DC offset from the baseband signal.

2. The receiver of claim 1,
wherein the plurality of instances of DC offset compensation components comprise virtual DC compensation components having a single hardware component configured to generate a plurality of estimated DC offsets according to one or more receiver state variables; and
wherein respective estimated DC offsets correspond to one of the plurality of receiver states.

3. The receiver of claim 1, further comprising:
a memory element configured to store filter states and DC compensation related state variables associated with the plurality of receiver states.

4. The receiver of claim 3, wherein the filtering element is further configured to measure a DC offset for a current receiver state and to replace an existing filter state and DC compensation related state variables with a new filter state and DC compensation related state variables determined from the measured DC offset.

5. The receiver of claim 4,
wherein the input signal comprises a plurality of time periods corresponding to different receiver states, and
wherein a filter state and DC compensation related state variables of a receiver state are updated while the receiver state is active and are held constant while the receiver state is inactive.

6. The receiver of claim 1, further comprising:
a memory element configured to store receiver states associated with one or more parameters that affect the one or more DC offsets of the baseband signal for the plurality of receiver states,
wherein the controller is configured to access the memory element and to change gain settings of an active receiver state based upon the one or more parameters.

7. The receiver of claim 6, wherein the controller is configured to adjust a bandwidth of the filtering element.

8. A receiver, comprising:
a receiver front-end configured to receive an input signal and to operate on the input signal with a plurality of receiver states to generate a baseband signal having one or more DC offsets corresponding to the plurality of receiver states;
a DC offset compensation circuit comprised within a feedback path or a feed forward path and configured to implement a plurality of instances of DC offset compensation components, which respectively generate an estimated DC offset corresponding to one of the plurality of receiver states; and
a controller configured to control a current receiver state of the receiver front end and to operate the DC offset compensation circuit to selectively apply one of the plurality of instances of DC offset compensation components to the baseband signal based upon the current receiver state;
wherein the DC offset elimination circuit, comprises
a feedback loop configured to generate an analog feedback signal that provides a coarse cancellation of a DC offset corresponding to a receiver state; and
a feed forward loop configured to generate a digital signal that provides a fine cancellation of the DC offset corresponding to the receiver state.

9. The receiver of claim 8,
wherein the coarse DC offset cancellation in the feedback loop is greater than the fine DC offset cancellation in the feed forward loop of the DC offset elimination circuit.

10. A receiver, comprising:
a receiver front-end configured to operate in a plurality of receiver states, wherein upon receiving an RF input signal the receiver operates on the RF input signal with a current receiver state to generate a baseband signal having a DC offset corresponding to the current receiver state;
a memory element configured to store a plurality of filter states and DC compensation related state variables;
a filtering element configured to implement a stored filter state corresponding to an active receiver state to generate an estimated DC offset corresponding to the active receiver state and to update the memory element based upon a sample of a filtering state of the active receiver state; and
a controller configured to control the current receiver state and to operate the DC offset filtering element to selectively apply one of the plurality of instances of DC offset compensation components to the baseband signal based upon the current receiver state;
wherein the filtering element is further configured to measure a DC offset for a current receiver state and to replace an existing filter state and DC compensation related state variables with a new filter state and DC compensation related state variables determined from the measured DC offset.

11. The receiver of claim 10, wherein the controller is configured to adjust a bandwidth of the filtering element.

12. The receiver of claim 11,
wherein the filtering element is configured to measure the DC offset at a measurement node and to provide the measured DC offset to a feedback loop and a feed forward loop;
wherein the feedback loop is configured to generate an analog signal that provides a coarse DC offset cancellation at a first summation node upstream of the measurement node; and
wherein the feed forward loop is configured to generate a digital signal that provides a fine DC offset cancellation at a second summation node located downstream of the measurement node.

13. The receiver of claim 12,
wherein the filtering element is configured to operate in a continuous operating mode or in a sample-and-hold operating mode;
wherein in the continuous operating mode the filtering element is configured to generate the estimated DC offset for each IQ sample in the baseband signal and to continuously apply the generated estimated DC offset to the baseband signal;
wherein in the sample-and-hold operating mode the filtering element is configured to generate the estimated DC offset for each IQ sample and to apply the generated estimated DC offset based on predetermined events.

14. The receiver of claim 13, wherein the memory comprises:
a first memory table configured to store a coarse filter state that is applied to a digital-to-analog converter, located within the feedback loop, that is configured to provide the coarse DC offset cancellation to the first summation node; and
a second memory table configured to store a fine filter state that is applied to a low-pass filter, located within the feed forward loop, which is configured to provide the fine DC offset cancellation to the second summation node.

15. A receiver, comprising:
a receiver front-end configured to operate in a plurality of receiver states, wherein upon receiving an RF input signal the receiver operates on the RF input signal with a current receiver state to generate a baseband signal having a DC offset corresponding to the current receiver state;
a filtering element comprised within a feedback path or a feed forward path and configured to implement a plurality of instances of DC offset compensation components, which respectively generate an estimated DC offset; and
a controller configured to control the current receiver state and to operate the DC offset filtering element;
wherein the filtering element is configured to operate in a continuous operating mode or in a sample-and-hold operating mode;
wherein in the continuous operating mode the filtering element is configured to generate the estimated DC offset for each IQ sample in the baseband signal and to continuously apply the generated estimated DC offset to the baseband signal; and
wherein in the sample-and-hold operating mode the filtering element is configured to generate the estimated DC offset for each IQ sample and to apply the generated estimated DC offset based on predetermined events.

16. The receiver of claim 15, wherein the controller is configured to adjust a bandwidth of the filtering element.

17. The receiver of claim 16, further comprising:
a memory element configured to store a plurality of filter states and DC compensation related state variables;
wherein the filtering element is configured to measure a DC offset for a current receiver state and to replace an existing filter state and DC compensation related state variables stored in the memory element with a new filter state and DC compensation related state variables determined from the measured DC offset.

18. The receiver of claim 17,
wherein the filtering element is configured to measure the DC offset at a measurement node, to store one or more filter states based the measured DC offset in the memory, and to provide the at least one of the one or more stored filter states to a feedback loop and a feed forward loop;
wherein the feedback loop is configured to generate an analog signal, based at least one of the one or more stored filter states, which provides a coarse DC offset cancellation at a first summation node upstream of the measurement node; and
wherein the feed forward loop is configured to generate a digital signal, based on at least one of the one or more stored filter states, which provides a fine DC offset cancellation at a second summation node located downstream of the measurement node.

* * * * *